US006650633B1

(12) United States Patent
Albers et al.

(10) Patent No.: US 6,650,633 B1
(45) Date of Patent: Nov. 18, 2003

(54) MONITOR NETWORK WITH ADVANCED INTELLIGENT NETWORK (AIN) FOR ELECTRONIC SURVEILLANCE

(75) Inventors: Raymond F. Albers, Vienna, VA (US); Charles H. Eppert, III, Fairfax, VA (US); Barry Pershan, Olney, MD (US); Daniel C. Michaelis, Ellicott City, MD (US); Michael G. Pilkerton, Fairfax, VA (US); Robert D. Farris, Sterling, VA (US); Christine Huff, Vienna, VA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/112,155

(22) Filed: Jul. 9, 1998

(51) Int. Cl.[7] ............................................... H04L 12/66
(52) U.S. Cl. ...................... 370/352; 370/353; 370/389; 379/221.01
(58) Field of Search ................................. 370/353, 352, 370/354, 356, 357, 359, 360, 381, 384, 386, 389, 392, 400, 401, 402; 379/12, 15.1, 15.02, 15.04, 17, 20, 22, 23, 220.01, 221.01, 201.02, 201.05, 207.07

(56) References Cited

U.S. PATENT DOCUMENTS

| | | | |
|---|---|---|---|
| 5,012,511 A | | 4/1991 | Hanle et al. |
| 5,241,588 A | | 8/1993 | Babson, III et al. |
| 5,247,571 A | | 9/1993 | Kay et al. |
| 5,475,732 A | | 12/1995 | Pester, III |
| 5,572,583 A | | 11/1996 | Wheeler, Jr. et al. |
| 5,592,530 A | | 1/1997 | Brockman et al. |
| 5,881,132 A | * | 3/1999 | O'Brien et al. ................ 379/35 |
| 6,081,590 A | * | 6/2000 | Crowley et al. ....... 379/221.13 |
| 6,122,255 A | * | 9/2000 | Bartholomew et al. ..... 370/237 |
| 6,169,793 B1 | * | 1/2001 | Godwin et al. ........ 379/221.13 |
| 6,195,714 B1 | * | 2/2001 | Li et al. ........................ 710/31 |
| 6,226,289 B1 | * | 5/2001 | Williams et al. ............ 370/385 |

OTHER PUBLICATIONS

Federal Communications Commission. "First Report and Order and Further Notice of Proposed Rulemaking In the Matter of Telephone Number Portability," p. 1–118, Appendices A–F (Jul. 2, 1996) & Erratum released Jul. 17, 1996.
Telecommunications Industry Association. "Lawfully Authorized Electronic Surveillance (Baseline Revision 10)," TR45.2, Subcommittee PN–3580 (Dec. 11, 1996).
Bell Atlantic Corporation. "Bell Atlantic Makes History by Providing Local Number Portability to Competitors in New York," p. 1–3 (May 28, 1998).

(List continued on next page.)

Primary Examiner—Kenneth Vanderpuye
Assistant Examiner—Phirin Sam
(74) Attorney, Agent, or Firm—Leonard C. Suchyta; Loren C. Swingle; Glenn R. Forbis

(57) ABSTRACT

In a public switched telephone network, interoffice call attempts to or from a line under surveillance generate a variety of query, response and release messages between the offices, as part of the normal procedures for setting up and tearing down the calls to and from the line. To insure that all calls under surveillance generate signaling messages, terminating, dialing and release triggers are set with respect to the target's line. As a result, the end office serving that line sends queries to a database on the signing network, receives response messages, and sends release report messages. A site processor compiles data from the signaling messages and forms a call detail record (CDR) for each call attempt relating to the target under surveillance. A central file server further processes the CDRs and supplies composite data regarding the target's calls through a data network connection to one or more law enforcement agencies.

42 Claims, 4 Drawing Sheets

OTHER PUBLICATIONS

Siemens Telecom Networks. "Acronym Guide: Siemens Telecom Networks: Local Number Portability," p. 1 (Apr. 2, 1998).

Siemens Telecom Networks. "Topic 7: Siemens Telecom Networks: Local Number Portability: Managing the Regional Databases," p. 1 (Apr. 2, 1998).

Siemens Telecom Networks. "Topic 11: Siemens Telecom Networks: Local Number Portability: How Is a Telephone Number Ported?", p. 1–2 (Apr. 2, 1998).

Siemens Telecom Networks. "Topic 1: Siemens Telecom Networks: Local Number Portability: Introduction," p. 1–3 (Apr. 2, 1998).

Siemens Telecom Networks. "Topic 4: Siemens Telecom Networks: Local Number Portability: Number Administration and Call Routing in Today's Network," p. 1 (Apr. 2, 1998).

USTA. "Local Number Portability (LNP): Overview of LNP," p. 1 (Apr. 2, 1998).

Siemens Telecom Networks. "Topic 5: Siemens Telecom Networks: Local Number Portability: Tomorrow's Network—the Location Routing–Number Architecture," p. 1–4 (Apr. 2, 1998).

"Number Portability News and Links," p. 1–7 (May 28, 1998).

Lucent Technologies. "Number Portability Technical Documents," p. 1–2 (May 28, 1998).

Nortel. "Number Portability –LNP Background," p. 1–4 (May 28, 1998).

Lucent Technologies. "Local Number Portability," p. 1–2 (May 28, 1998).

Ovum. "Number Portability: Strategies for Market, Technical and Regulatory Success," p. 1–3 (May 28, 1998).

"Midwest Region: Primer for Local Number Portability," Issue 2, p. 1–31 (May 28, 1998).

Nortel. "Local Number Portability: LNP Backgrounder," p. 1–4 (May 28, 1998).

\* cited by examiner

MONITOR NETWORK WITH ADVANCED INTELLIGENT NETWORK (AIN) FOR ELECTRONIC SURVEILLANCE

CROSS-REFERENCE TO RELATED APPLICATIONS

This application is related to patent applications Ser. Nos. 09/112,160, 09/112,154, and 09/112,473, filed, Jul. 9, 1998. Those applications are incorporated by reference herein in their entirety.

TECHNICAL FIELD

The present invention relates to a method and system for providing lawfully authorized electronic surveillance service in a Public Switched Telephone System (PSTN) and more particularly to configuring existing telephone networks using various types of switches to effectively and economically provide such service.

Acronyms

The written description uses a large number of acronyms to refer to various services, messages and system components. Although generally known, use of several of these acronyms is not strictly standardized in the art. For purposes of this discussion, acronyms therefore will be defined as follows:
Address Complete Message (ACM)
Advanced Intelligent Network (AIN)
American National Standards Institute (ANSI)
ANswer Message (ANM)
Automated Message Accounting (AMA)
Automatic Number Identification (ANI)
Call Processing Record (CPR)
Central Office (CO)
Common Channel Signaling (CCS)
Communications for Assistance for Law Enforcement Act (CALEA)
Custom Local Area Signaling Services (CLASS)
Federal Bureau of Investigation (FBI)
Generic Address Parameter (GAP)
Generic Data Interface (GDI)
Initial Address Message (IAM)
Integrated Service Control Point (ISCP)
Integrated Services Digital Network (ISDN)
ISDN User Part (ISUP)
Intelligent Peripheral (IP)
Local Access and Transport Area (LATA)
Local Number Portability (LNP)
Location Routing Number (LRN)
Multi-Services Application Platform (MSAP)
Numbering Plan Area (NPA)
Office Equipment (OE)
Origination Point Code (OPC)
Personal Communications Service (PCS)
Plain Old Telephone Service (POTS)
Point in Call (PIC)
Personal Identification Number (PIN)
Primary Rate Interface (PRI)
Public Switched Telephone Network (PSTN)
Records Accounting Office (RAO)
Record Change Memory Administration Center (RCMAC)
Remote Memory Administration System (RMAS)
Service Control Point (SCP)
Service Creation Environment (SCE)
Service Management System (SMS)
Service Switching Point (SSP)
Signaling System 7 (SS7)
Signaling Point (SP)
Signaling Transfer Point (STP)
Simplified Message Desk Interface (SMDI)
Speaker Identification/Verification (SIV)
Telecommunications Industry Association (TIA)
Terminating Attempt Trigger (TAT)
Time Slot Interchange (TSI)
Traffic Service Position System (TSPS)
Transaction Capabilities Applications Part (TCAP)
Transmission Control Protocol/Internet Protocol (TCP/IP)

BACKGROUND

Historically in the United States authorities such as city, state, or federal police authorities, may engage in electronic surveillance (frequently referred to in the vernacular as wire-tapping), when duly authorized to perform such an activity by a cognizant judicial authority. In earlier times, when public telephone service was virtually all analog the procedure was relatively simple. Assuming surveillance of a residence connected to the telephone network by a local loop consisting of a pair of copper wires, the usual practice was to locate a convenient cross connect and bridge on to the two wire analog circuit. The entity conducting the surveillance then engaged the serving telephone network operator or company to provide a circuit from that location to the law enforcement location. The law enforcement organization could then monitor the conversations, generally referred to as content, as well as the call set up and related signaling. Statistically approximately 90 percent of the authorized surveillance in the United States does not cover content but signaling data. Such events are referred to as Pen register taps.

With the widespread use of digital communication and control signaling, the simplicity and ease of the prior surveillance procedures has largely disappeared. As a result, law enforcement agencies, and cooperating Public Switched Telephone Networks (PSTNs), are forced to cope with a considerably more complex and costly substitute set of procedures. Partially in response to this situation Congress passed Public Law 103-414, the Communications Assistance for Law Enforcement Act (CALEA). The Telecommunications Industry Association (TIA), accredited by the American National Standards Institute (ANSI), was selected by the telecommunications industry to promulgate the industry's CALEA standard. TIA promptly initiated a standards program. Initial disagreements within industry were resolved, and TR45 Lawfully Authorized Electronic Surveillance SP-3580, Baseline Revision 10 was produced. These have become known as the "safe harbor" standards pending resolution of still outstanding differences with respect to certain preferences of the Federal Bureau of Investigation (FBI).

The CALEA specifications include the requisite that the target for surveillance continue to be provided with all subscribed enhanced, CLASS, and other services, and that the surveillance be completely transparent. The central office switches currently in use in the public switched telephone networks were not designed with CALEA functions in mind. As a result it is not surprising that not all types of existing switches are readily adapted to operate in a network that meets major CALEA requirements.

The basic surveillance problem has undergone continued evolution as telecommunications technology has advanced and provided the public with an ever-increasing variety of services. Illustrative of such services, which create added complexity for effective telephone surveillance, is call forwarding and particularly remotely activated call forwarding. Another example is central office based speed dialing.

Since the proposed CALEA requirements are worded in terms of service, i.e., monitoring the telephone service (signaling and speech) of the subject, and anything that can be accomplished with the service, significant problems are presented. This becomes particularly acute when coupled with a desire that the surveillance preferably be near universally applicable to all telephone central offices, including end offices that rely on legacy switches. One example of a specific problem is encountered with end offices using Lucent (formerly AT&T) 1AESS switches. These switches are among the earlier variety of stored program controlled switches and are rapidly being retired. As a consequence, it would not be wise to expend large sums to develop CALEA feature software for these switches. On the other hand the later Lucent 5ESS switches will be in service for many years to come and it may make sense to develop the requested surveillance capabilities in a number of network configurations. Cost considerations weigh heavily in selecting and providing an acceptable solution.

It is accordingly an object of the present invention to provide a relatively straightforward and cost effective solution to the foregoing problem.

DISCLOSURE OF THE INVENTION

For some years, the telephone industry has been developing an enhanced telephone network, sometimes referred to as an Advanced Intelligent Network (AIN), for providing a wide array of new voice grade telephone service features. In an AIN type system, local and/or toll offices of the public telephone network detect one of a number of call processing events identified as AIN "triggers". An office which detects a trigger will suspend call processing, compile a call data message and forward that message via a common channel signaling (CCS) link to a database system, such as an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCS link. The network offices then use the call control message to complete the particular call. An AIN type network for providing an Area Wide Centrex service, for example, was disclosed and described in detail in commonly assigned U.S. Pat. No. 5,247,571 to Kay et al., the disclosure of which is entirely incorporated herein by reference.

In an AIN network developed by the Regional Bell Operating Companies (RBOCs) and Bell Communications Research (Bellcore), a terminal and software system referred to as 'SPACE' functions as the service creation environment and/or service provisioning system for the AIN control functions in the Service Control Points (SCPs) and Integrated Service Control Points (ISCPs) For example, as disclosed in U.S. Pat. No. 5,241,588 Babson, III et al., customized call processing information records are created and/or modified in a graphical environment, by creating or modifying a customer's service graph on the display terminal. Data corresponding to the service graph is then stored in the SCP. Other terminal and software systems could be used to create and provision the AIN services. For AIN services today, however, telephone company personnel widely utilize the SPACE system to create templates for the service logic for new services. When customers subscribe to the services, the templates are filled in with the subscribers' data to create individual call processing records (CPRs). The CPRs are stored in a database in the ISCP, for controlling actual call processing.

Many of the enhanced communication services offered by the AIN control system permit a subscriber to input control information, to manage services as desired. For example, in a simple call forwarding or redirection service, the subscriber may activate or deactivate the forwarding feature and may change the 'forward to' number from time to time to route calls to different destinations.

Typically such a call forwarding service may be activated by subscribers dialing an activation code followed by a local or toll telephone or directory number (DN). Thereafter, until the subscriber dials a de-activation code, the switching system forwards all of the subscriber's calls to the thus entered forwarding directory number. In effectuating this service a party served by a local SSP switch office and who subscribes to call forwarding service has stored in the memory at the office, data identifying the party as a subscriber. In addition data is also stored at the office indicating if the service is activated and, if so, a directory number to which incoming calls are to be forwarded. When an incoming call is received the stored program of the office directs the interrogation of the memory data associated with the called station to determine if the called party subscribes to call forwarding service. If not, or if the service is not activated, the call is completed to the called station in ordinary fashion. However if a call forwarding service is active for the called party the stored program obtains the forwarding number from memory and from that point acts effectively as an originating office with respect to the new number. That is, the office may complete the call locally to the new number if it is served by the office, or it may seize an outgoing trunk to another local office or to a toll network, as the situation demands, and outpulse the new number to a distant office to complete the call.

With standard call forwarding, programming is accomplished either from the subscriber's primary DN or manually by a technician at the Record Change Memory Administration Center (RCMAC), using the Remote Memory Administration System (RMAS). Conventional Call Forwarding provides an access code and a series of prompts to guide the customer through the call forwarding programming sequence. Recently there has been implemented a new feature which may be referred to as Remote Access to Call Forwarding (RACF). With Remote Access to call forwarding a subscriber can utilize any telephone equipped with DTMF signaling capability, dial a special access number, followed by a Personal Identification Number (PIN), and then dial additional codes in order to activate or deactivate the call forwarding feature.

An improved version of a system for providing such call forwarding is described in commonly assigned Hanle et al U.S. Pat. No. 5,012,511, issued Apr. 30, 1991, titled Method of and System for Control of Special Services by Remote Access. That patent is incorporated by reference herein in its entirety. One version of the system described in the Hanle et al. patent for remotely programming switches, uses multiplexing of processed recent change signals delivered to the switch. This particular version of the Hanle et al system provides very prompt, approaching virtually real time, effectuation of callforwarding instructions. In this procedure the instructions pass through and are stored in a node which may be located in a multi-services application platform (MSAP).

In a public switched telephone network, interoffice call attempts to or from a line under surveillance generate a variety of query, response and release messages between the offices, as part of the normal procedures for setting up and tearing down the calls to and from the line. According to one feature of the invention means are provided to insure that all calls to or from a line under surveillance generate signaling messages. This is accomplished according to one embodiment of the invention by setting terminating, dialing, and release triggers with respect to the target line, as well as any lines that may become associated with the target line. As a result, the end office serving the target, which may or may not be the end office to which the target's local loop line is attached, sends queries to a database on the signaling network, receives response messages, and sends release report messages, even for intraoffice calls. These messages include all of the call set-up and tear down messages, as well as the query, response and release report messages communicated between the office and the database.

A site processor, acting as a data filter, compiles data from all of the signaling messages relating to each individual call, to or from an identified telephone number or line (the target). The site processor forms a call detail record (CDR) for each call attempt relating to an identified target under surveillance. Site processors associated with multiple switches involved in surveillance activities may upload CDRs to a central file server for parsing, sorting and further processing. The server supplies composite data regarding calls to and from targets under surveillance through a data network connection to processors of one or more law enforcement agencies. The activities involved are transparent to the called and calling parties.

Caller ID signals reflect the target line despite the fact that such would not typically occur with conventional PSTN network architecture and procedures which may be utilized. Likewise billing is controlled to insure that no detail in those procedures indicates that anything but normal telephone service is involved. With respect to call forwarding, signaling information relating to installation of the service, activation and de-activation, and the identification of the forwarding number or numbers are collected at multiple nodes in the system. The necessary information to conduct surveillance on forwarded calls is then derived or forwarded from the appropriate node or nodes in order that the surveillance may be complete.

Pursuant to one feature of the invention the advanced intelligent network is used in conjunction with programmable monitors to trap and temporarily store or record predetermined data associated with designated call attempts, call set-up, call tear down, originating and destinating directory numbers, call duration, and other information with respect to the telephone activities of parties under surveillance. This information from monitors in one cluster is stored in a site controller for that cluster. That information and similar information gathered from site controllers for other clusters is sent to a central controller server and from there is distributed via a telephone network intranet to the surveillance center. Under the direction of a telephone network management system information from other sources in the network is likewise forwarded via the telephone network intranet to the surveillance center.

BRIEF DESCRIPTION OF DRAWINGS

The drawing figures depict the present invention by way of example, not by way of limitations. In the figures, like reference numerals refer to the same or similar elements.

BEST MODE FOR CARRYING OUT THE INVENTION

Figure 1:
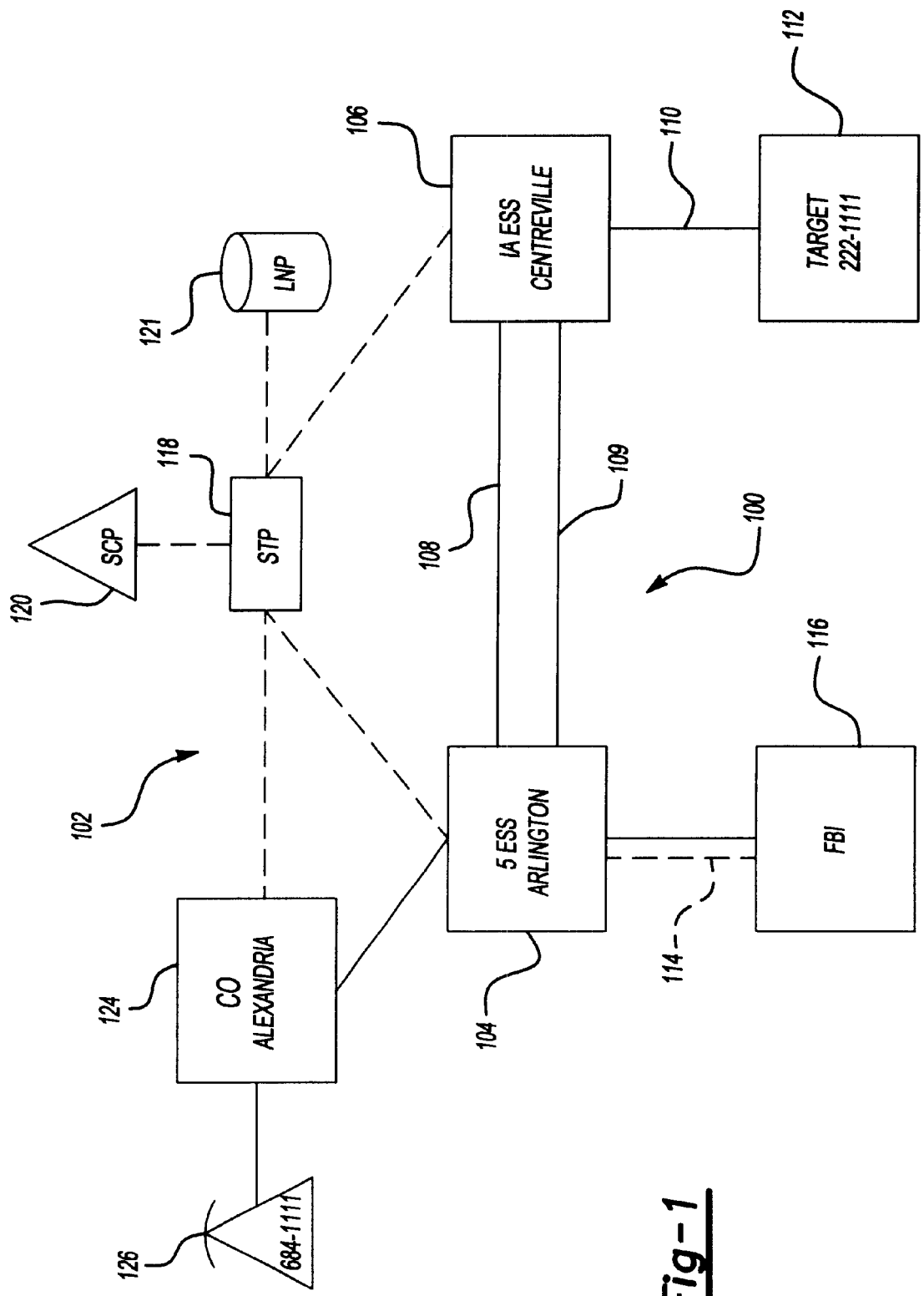
FIG. 1 is a diagrammatic illustration of a public switched telephone network showing its relation to an SS7 common channel signaling network according to one embodiment of the invention.

Referring to FIG. 1 there is shown one preferred embodiment of a Public Switched Telephone Network (PSTN) arranged in an architecture adapted to being operated to implement one or more preferred methods of the invention. Referring to that figure, there is shown in diagrammatic form a Public Switched Telephone Network (PSTN) 100 having an Advanced Intelligent Network (AIN) common channel signaling (CCS) system 102. The PSTN 100 includes an end office (EO) or central office (CO) switching system 104. The switching system 104 is assumed to be a Lucent 5ESS switch for purposes of this example. A second end office switching system is shown at 106, and this switch is assumed to be a Lucent 1AESS switch. The 1AESS switch is not subject to ready modification to implement CALEA features when used in this embodiment of the invention. The end offices 104 and 106 are connected by a trunks or trunk groups shown at 108.

These end offices 104 and 106 are located in the same LATA but are geographically spaced. The end office 106, containing the 1AESS switch, is connected by a local loop 110 to the residence 112. The residence 112 has Plain Old Telephone Service (POTS) and is assumed to be occupied by a target of surveillance (target). The end office 104, served by the 5ESS switch, is connected by a voice and data link 114, preferably an ISDN PRI link, to customer premises 116. The customer premises 116 is assumed to be occupied by the enforcement authority having the surveillance authorization, here indicated as the FBI by way of illustration. The ISDN voice and data link 114 is preferably dedicated.

The common channel signaling (CCS) advanced intelligent network (AIN), is represented by the signal transfer point (STP) 118 and service control point (SCP) 120, which may be an Integrated Services Control Point (ISCP). All of the switching offices depicted are assumed to be service switching point (SSP) capable. The STP is linked to the two end offices 104 and 106 by data links shown by broken lines. Likewise the STP is shown linked to the SCP by a data link shown as a broken line.

In 1996, the Federal Communications Commission (FCC) released the "First Report and Order and Further Notice of Proposed Rulemaking," which requires Local Number Portability (LNP) in the top MSAs (Metropolitan Statistical Areas) by the end of 1998. In rat January of 1998 Bell Atlantic announced that it was providing LNP service to two Competitor Local Exchange Carriers in New York and would offer the service in twenty-four major metropolitan areas and additional areas by the end of the year. It is a feature of this invention that it not only utilizes the capabilities of LNP where it exists, but also provides the surveillance service seamlessly through areas with as well as without LNP capability. LNP capability in FIG. 1 is represented by the LNP database 121 connected by data link to the STP 118.

In order to accomplish the purposes of the invention according to this embodiment, CALEA capabilities are first established in the office 104, which contains the more feature rich 5ESS switch. To this end the 5ESS switch is provided with a CALEA module which comprises a processor and processor program and data store. The CALEA module is in two way data communication and one way voice communication with the administrative module of the 5ESS switch as is later described in detail with respect to FIG. 2.

According to a first method of operation with the network shown in FIG. 1, all of the central offices in this LATA have either a Local Number Portability (INP) or a 3/6/10 SDS (Specific Digit String) trigger set against the Centreville NPA/NX 703-222. According to the invention both the SCP 120 database and the LNP database 121 have established therein a table which contains a translation of the target number from 703-222-111 to a local routing number (LRN), which may be 875-1111, by way of illustrative example. The establishment of both databases is not necessary so long as one database is provided. However the invention comprehends that both databases will occur in areas being convened to provide LNP service.

In addition to the LNP or 3/6/10 SDS trigger a terminating attempt trigger (TAT) is, set in the 5ESS office 104. This office may serve as the CALEA implementation office for non-CALEA capable switches in this LATA or within a designated area in this LATA.

The operation for incoming calls to the target is best illustrated by a concrete example. For this purpose there is shown in FIG. 1 an additional end office 124 which is illustratively located in Alexandria, Va. The end office 124 serves an Alexandria subscriber having a terminal 126, which may have a directory number of 703-684-1111. When the Alexandria subscriber uses terminal 126 to dial the number of the target 703-222-1111, the 3/6/10 or LNP trigger, which is set in all end offices in the LATA, including the Alexandria office 124, suspends processing and launches a query to the SCP 120 or to the LNP database 121 via STP 118.

The SCP or LNP database consults its table against the number 703-222-1111 and determines the associated Local Routing Number (LRN) 703-875-1111. The SCP thereupon frames a TCAP response to the query and instructs the Alexandria switch 124 to set up a route for that 703-875-1111 call in the same manner as it would for any other 875 or local portability number. The Alexandria switch 124 then regenerates the original call to the Arlington switch 104, sending along the 703-222-1111 directory number of the target in the GAP (Generic Address Parameter) field of the signaling message. The SSP recognizes the LRN. The original called number is pulled from the Generic Address Parameter (GAP) and placed in the called party ID field. The Arlington SSP routes the call to 703-222-1111.

Pursuant to the incoming signaling message, the CALEA module and regime or software searches its table of target directory numbers and confirms that the 222-1111 number of the target 112 is to receive surveillance processing. The Arlington switch 104 now will perform all of the routines required by the CALEA module of the 5ESS switch, which is presently described in further detail. Further, at this point the call encounters a terminating attempt trigger in the Arlington 5ESS office 104. This results in a further query via a TCAP message from the Arlington 5. ESS office 104 to the SCP 120 via the STP 118. The SCP returns a further TCAP message to the 5ESS switch, which instructs the 5ESS switch to route the call to telephone number 703-222-1111 in the Centreville 1AESS switch 106 via the common interoffice trunk group 108. At this time ring signal is provided to the target terminal 112. This embodiment of the invention eliminates the need for a dedicated Foreign Exchange (FX) line for each surveillance target which is described in the common owner's copending application Ser. No. 09/112,154, above as a related application.

When the Arlington switch 104 responds to the incoming signaling message and the TCAP message and initiates its routine against the target 112 in Centreville, it performs two primary functions: It routes the call to the target telephone '112 via the Centreville switch 106 and the public interoffice trunk group 108, and it implements surveillance against the target by means of the programming of the CALEA module and software in the 5ESS switch 104, which is specified in detail in the previously referenced Telecommunications Industry Association TR45.2 Subcommittee PN-3580, Baseline Revision 10 Standard. That Standard defines the current services and interfaces for lawfully authorized electronic surveillance. It permits and prescribes delivery of specified communications and call-identifying information to a law enforcement agency subject to legal authorization. The standard defines a messaging protocol between a telecommunication service provider and a law enforcement agency. That standard is incorporated herein by reference in its entirety.

An outgoing target call is now described. When the target goes off-hook at target premises 112, this appears as an off-hook and request for service in the Centreville central office 106. There is an off-hook delay trigger set in the Centreville central office on the target line. The off-hook thus triggers a query from the Centreville office 106 to the SCP. The SCP returns a TCAP response directing the 1AESS switch to route the call to the call to the Arlington 5ESS, using an IAM signaling message in which the called number is substituted for the calling number in the charge number field, the LRN of the 5ESS switch is placed in the called number field, and the number of the target (703-222-1111) is placed in the GAP field.

When the IAM signaling message reaches the Arlington 5ESS switch it encounters a terminating attempt trigger and directs a TCAP query message to the SCP. The Call Processing Record (CPR) in the SCP recognizes that calls from calling number 703-222-1111 are subject to surveillance treatment, and responds to the Arlington 5ESS with a TCAP message in which the originally dialed called number is extracted from the charge number field, replaced with the target's number (703-222-1111), and placed in the called number field. The Arlington 5ESS, on receiving the TCAP message from the SCP, will perform two primary functions. First, it will route the call to the dialed number, populating the "calling number" field of its signaling message with the target's number (703-222-1111) so that any calling number display devices at the called party's telephone will display the normal telephone number of the target, thus achieving the "transparency" required by CALEA.

In addition, the 5ESS switch will run its CALEA service regime associated with that target line. The CALEA module responds by executing its software to provide the enforcement authority 116 with the one-way information to which their specific authorization entitles them.

This procedure in response to the off-hook delay trigger also directs the Arlington office to implement collection and reporting of information as to the start of the call, completion of the call, time, and when the call is completed. The Arlington office 104 is thus instructed to add an AMA journal or equivalent record for that call based on what the SCP, the 5ESS switch, and the CALEA storage have in their collective information for handling that call. The SCP will direct that the billing which is accomplished from the Arlington office be attributed to the Centreville office as the originating office. The Arlington office will enter this in its journal and send it to the Revenue Accounting Office (RAO). The rating and charges are based on Centerville parameters. In addition the SCP response to the off-hook delay trigger will attend to insuring that the caller ID data being sent to a called party identifies the target number 222-1111, and not the Arlington number 703-875-1111.

Because the functioning of the invention is dependent upon the operation of switching systems the operation of a typical 5ESS switch is described. The addition of a CALEA module to this switch is then discussed.

Figure 2:
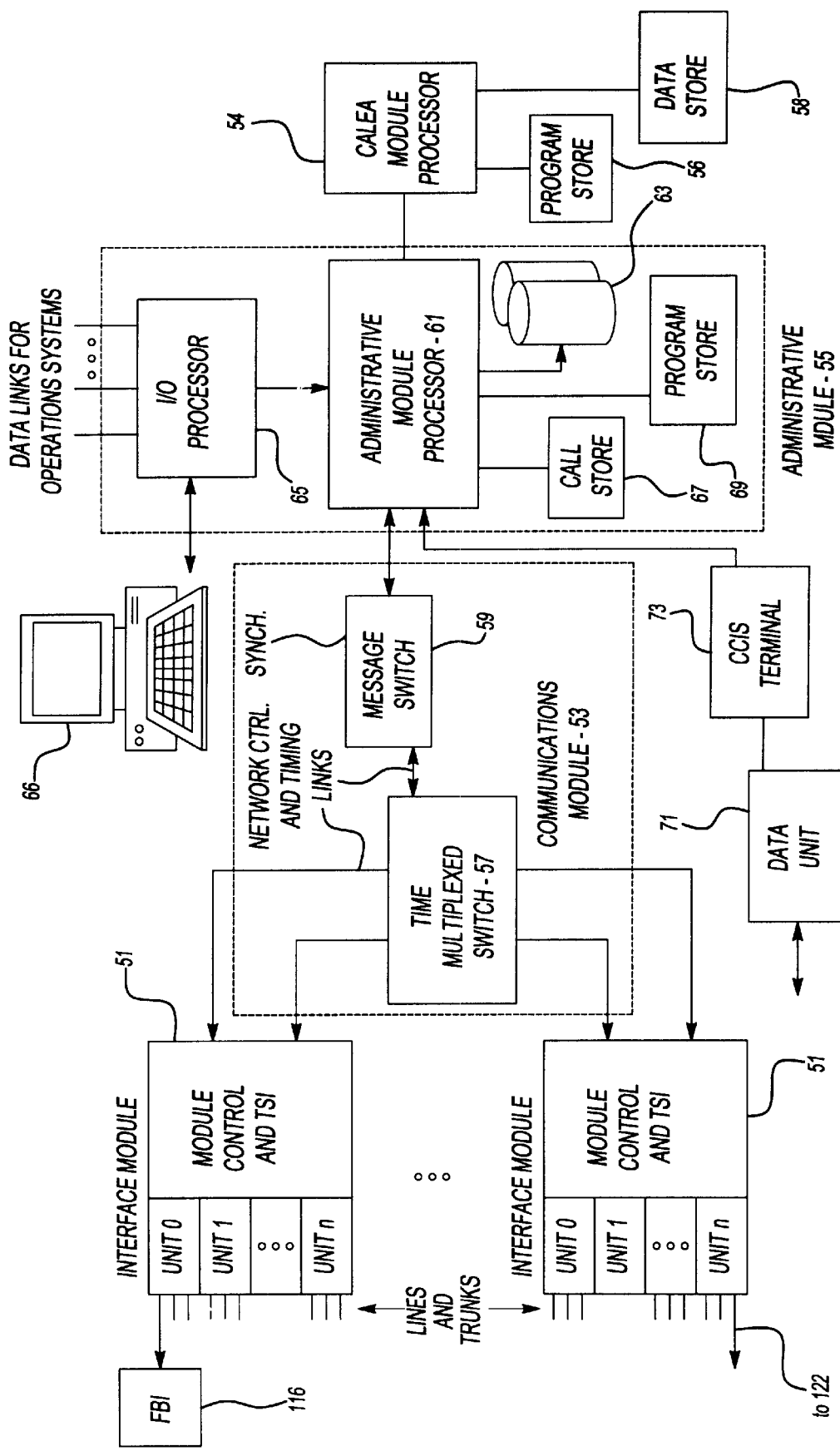
FIG. 2 shows a simplified block diagram of an electronic program controlled switch of the SSP type, which has been modified pursuant to one preferred embodiment of the invention.

FIG. 2 shows a simplified block diagram of an electronic program controlled switch of the SSP type. As illustrated, the switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Each such termination is identified by an OE number. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones and receive and detect dialed digits in pulse code or dual-tone multi-frequency form.

In the illustrated embodiment, the unit 0 of the upper interface module 51 provides an interface for the signaling and communication links to an enforcement agency terminal 122 shown in FIG. 1. In this implementation, the links preferably consist of one or more ISDN PRI circuits each of which carries 23 bearer (B) channels for communication traffic (content traffic) and one data (D) channel for signaling data. The connection may be referred to as a half tap because it is unidirectional. The enforcement authority, such as the FBI receives the authorized data and content but is isolated from the target. This is also essential in order that the surveillance be maintained transparent to both the target and any calling party in contact with the target.

Each interface module 51 includes, in addition to the noted interface units; a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time-multiplexed switch 57 and a message switch 59. The time multiplexed switch 57 provides time division transfer of digital voice data packets between voice channels of the interface modules 51 and transfers signaling data messages between the interface modules. The switch 57, together with the TSIs of the interface modules, form the overall switch fabric for selectively connecting the interface units in call connections.

The message switch 59 interfaces the administrative module 55 to the time multiplexed switch 57, so as to provide a route through the time multiplexed switch permitting two-way transfer of control related messages between the interface modules 51 and the administrative module 55 and the CALEA module processor 54 and its program store 56 and data store 58. In addition, the message switch 59 terminates special data links, for example a link for receiving a synchronization carrier used to maintain digital synchronism.

The administrative module 55 and its adjunct CALEA module 54 provide high level control of all call processing operations of the switch. The administrative module 55 includes an administrative module processor 61, which is a computer equipped with disc storage 63, for overall control of central office (CO) operations. Likewise the CALEA processor is a computer equipped with a disk storage 56 which contains one or more CALEA programs or applications which are run to effect control of the associated switching system to implement CALEA operations and functions. These are specified in detail in the above-mentioned PS or PN 3580 which is incorporated by reference herein in its entirety.

The CALEA data store serves as a database of tables and data reflecting the treatment to be accorded telephone or other subscriber terminals authorized for surveillance in accord with the limits of the authorization which is applicable. The data store 58 also serves as a repository of the information derived from signaling messages by the processor 54. As such the data store may contain the filtered results from all of the signaling messages relating to each individual call, to and from an identified telephone number or line. The CALEA processor or site processor forms a call detail record (CDR) for each call attempt relating to an identified target under surveillance. In the case where a number of CALEA modules are involved and associated with different switches the various site processors may upload CDRs to a central file server (not shown) for parsing, sorting and further processing. The server may supply composite data regarding calls to and from targets under surveillance through a data network connection to one or more law enforcement agencies.

The administrative module processor 61 communicates with the interface modules 51 through the communication module 53. The administrative module 55 may include one or more input/output processors (not shown) providing interfaces to terminal devices for technicians and data links to operations systems for traffic, billing (AMA), maintenance data, etc.

A CCIS terminal 73 and an associated data unit 71 provide an SS7 signaling link between the administrative module processor 61 and CALEA module processor 54 and one of the signal transfer points (STPs) in the Advanced Intelligent Network (AIN). Although only one such link is shown, preferably there are a plurality of such links providing redundant connections to both STPs of a mated pair and providing sufficient capacity to carry all necessary signaling to and from the particular end office 104. The SS7 signaling through the terminal 73, the data unit 71 and the STPs provides two-way signaling Research. The ISCP 338 is an integrated system that includes the SCP database as well as a number of closely associated management systems, both for service control input and for service reporting.

As illustrated in FIG. 2, the administrative module 55 also includes a call store 67 and a program store 69. Although shown as separate elements for convenience, these are typically implemented as memory elements within the computer serving as the administrative module processor 61. The program store 69 stores program instructions which direct operations of the computer serving as the administrative module processor 61.

For each call in progress, a register assigned within the call store 67 stores translation and user profile information retrieved from disc storage 63 together with routing information and any temporary information needed for processing the call. For example, for a residential customer initiating a call, the call store 67 would receive and store line identification and outgoing call billing information corresponding to an off-hook line initiating a call. A register in the call store is assigned and receives profile data from the disc memory both for originating subscribers on outgoing calls and for terminating subscribers on incoming calls. According to the invention the outgoing billing information and the target profile data may be modified both pursuant to signaling from the CALEA module and signaling received from the SCP.

It will be seen that these embodiments of the invention provides multiple methods for enabling authorized telephone surveillance by an enforcement authority pursuant to the CALEA requirements, despite the fact that certain end offices in the telecommunications network lack the capacity to implement the CALEA software and methodology.

Figure 3:
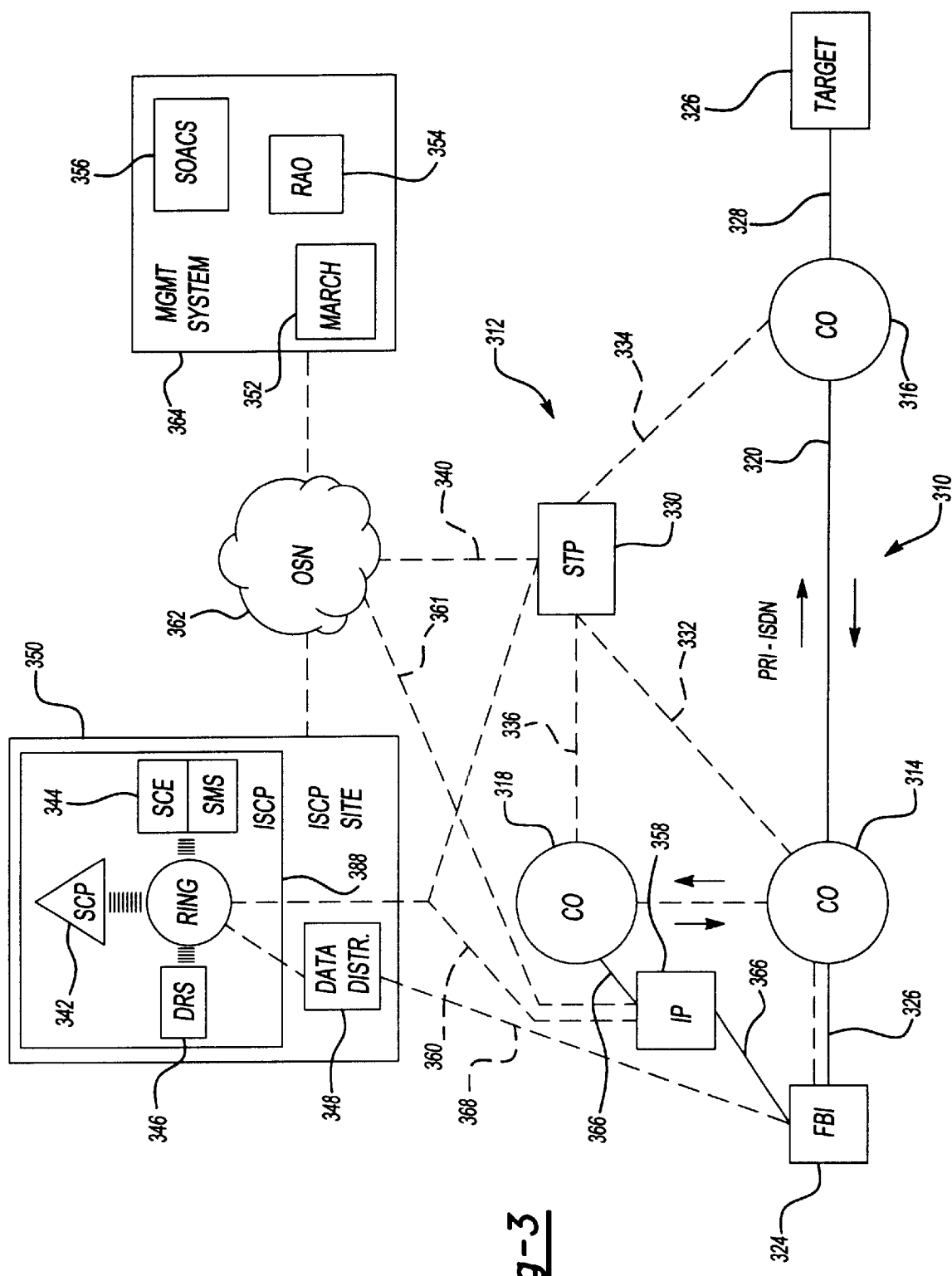
FIG. 3 is a diagrammatic illustration of a public switched telephone network showing its relation to an SS7 common channel signaling network, intranet, and intelligent peripheral (IP) according to another embodiment of the invention.

Referring to FIG. 3 there is shown a high level view of still another preferred embodiment of the invention. It is a particular feature of this embodiment that it is not required that the involved network switches possess the capability imparted to the 5ESS switch 104 in FIG. 1. This embodiment of the invention relies on a combined application of capabilities of AIN, particularly the data distributor which forms an element of enhanced SCPs, an Intelligent Peripheral (IP), and the multi-service application platform associated with system management.

FIG. 3 shows a switched telephone network shown generally at 310, and an enhanced AIN CCS control network shown generally at 312. The telephone network is represented by central switching offices 314, 316, and 318. These offices include program controlled switching systems (PCSs) which are generally of the type illustrated and described with respect to FIG. 2. The specific type of switch in the central office is not critical to this embodiment of the invention and do not require the CALEA module shown in the switching system of FIG. 2. The switching offices are shown connected by trunks or trunk groups 320 and 322. The central office 314 is the end office for the surveillance agency (FBI) 324, and is connected thereto by a dedicated voice and data link 326 shown as combined solid and broken lines. The switching office 316 serves as the end office of the customer under surveillance (target) 326. The end office 316 may be connected by a twisted pair local loop 328 to provide Plain Old Telephone Service (POTS) to the target.

The advanced intelligent network (AIN) is represented by an STP 330 connected to the central offices 314, 316, and 318 by data links 332, 334, and 336, shown as broken lines. STP 330 is also connected to an SCP by the data link 340. In the preferred implementation the SCP 342 constitutes an element of an Integrated Service Control Point (ISCP) 338, of a type developed by Bell Atlantic and Bell Communications Research. The ISCP 338 is an integrated system that includes the SCP database as well as a number of closely associated management systems, both for service control input and for service reporting.

In this implementation, the SCP 342 is a processor, which maintains a Multi-Services Application Platform (MSAP) database (not separately shown) which contains call processing records (CPRs) for processing of calls to and from various subscribers. Among its other system components, the ISCP includes a Service Management System (SMS) and a terminal subsystem referred to as a Service Creation Environment or SCE for programming the MSAP database in the SCP for the services subscribed to by each individual customer. The SMS and SCE may be implemented as a SPACE system 344. The ISCP 338 typically includes a Data and Reporting System (DRS) 346, for accumulating AIN service usage statistics. The ISCP 338 also connects and communicates with one or more other data reporting systems, represented by way of example by the data distributor (DD) 348. The ISCP 338 connects through SS7 links to one or more STPs, shown in FIG. 3 by the illustrative link 340 for signaling communications relating to call processing.

The elements within and associated with one ISCP 338 logically form an ISCP 'site' 350, for managing, providing, and reporting intelligent network services for customers served through central offices 314, 316, and 318 in a particular area or region. A large carrier may operate a series of such ISCP sites. For network and service management purposes, the ISCP sites all connect to and communicate via a telephone company operations systems network (OSN) or intranet 362.

A multi-services or management platform (MSP) 364 also connects to and communicates with the central office switches 314, 316, and 318 and other nodes of the network via the intranet. The telephone carriers have developed and operate a wide variety of computerized systems for managing services offered through the telephone central office switches, and only a few examples of such systems are shown in the management platform 364 in FIG. 3.

For example, Memory Administration Recent Change System (MARCH) 352 processes and transmits data to the appropriate central office switches 314, 316, and 318 for entry into switch memory, to create and update subscriber profiles in the switches and thereby control services provided by the switches to subscribers. Also, the central office switches accumulate Automatic Message Accounting (AMA) records for all calls through the switches. The switches dispatch the AMA records through the Telco intranet to a computer system serving as a Revenue Accounting Office (RAO) 354.

Service Order Administration and Control System (SOACS) 356 processes orders for new services or modifications to existing services. For example, when a customer calls orders a new telephone service associated with the customer's telephone number, for example call forwarding, dial tone, call waiting or caller ID, or calls to change an existing service, for example call forwarding, SOACS performs a number of processes relating to satisfying that order and implementing the requested service. For the switch memory related functions, for example, SOACS processes the data into appropriate format and hands off the formatted data to the MARCH system 352. MARCH in turn qualifies the data, and if the data meets the relevant qualification criteria, MARCH transmits the data to the appropriate central office switch through RCMAC for entry into memory. The above-identified Hanle et al. patent provides a detailed description of such operation.

According to this embodiment of the invention the telephone network is provided with at least one intelligent peripheral (IP) 358 which is connected with the ISCP 338 by an SS7 data link 360. The IP is also preferably connected to the OSN intranet 362 for additional communication with the ISCP site 350 and the multi-service management system 364. The intelligent peripheral 358 preferably serves a large area. By way of example, the area serviced by the ISCP 338, or the area served by the ISCP 338 and other ISCPs connected thereto. In this manner CALEA surveillance can be implemented through large regions of the telephone network with minimal adjunct equipment. The intelligent peripheral or IP may be of the type described in commonly assigned U.S. Pat. No. 5,572,583 to David F. Wheeler, Jr. and Robert D. Farris. That patent discloses an intelligent peripheral (IP) for providing enhanced call processing functions, such as announcement and digit collection, voice recognition, facsimile mail and voice mail, in an AIN type telephone network. The IP connects through telephone line groups to one or more Service Switching Point (SSP) offices of the telephone network. The IP also communicates with the ISCP via a signaling network separate from the voice circuits and from the CCS network, such as the OSN intranet 362. One a major use for the IP 358 according to this embodiment of the invention, relates to provisioning and/or modifying. services such as call forwarding.

The IP provides prompts and receives DTMF or speech inputs from subscribers. Typically, a telephone company technician initially sets up a subscriber's service using the Service Creation Environment or SCE in the ISCP. As part of that procedure, the technician establishes one or more data tables for the subscriber in the service control point (SCP) database. Subsequently, the subscriber may control the service by inputting data to populate the subscriber's data table(s) through an interaction with the ISCP and/or the IP, and thence through MARCH. The newly input control data is transferred from the IP to the ISCP for storage and for subsequent control of the subscriber's communication services. A further detailed description of the operation of such provisioning, maintenance and operation of such a combination of ISCP site, switch management system, and intranet in a telephone system using enhanced AIN is set out in commonly assigned application of Te-An Chang et al., Ser. No. 08/904,117, filed Jul. 31, 1997. The portion of that application pertaining thereto is incorporated by reference herein in its entirety.

The intelligent peripheral or IP 358 connects to at least one of the central offices 314, 316, and 318. This connection is shown as central office 318 in FIG. 3. The connections transport both communication traffic and signaling. While the connection between the central office 318 and the IP 358 might use a combination of a T1 and a Simplified Message Desk Interface (SMDI) link, this connection preferably utilizes a primary rate interface (PRI) type ISDN link. Each such connection provides digital transport for a number of two-way voice grade type telephone communications (B or bearer channels) and a channel transporting signaling data messages (D or data channel) in both directions between the switch 318 and the IP 358.

There are certain circumstances in which the ISCP 338 communicates with the IP 358. These communications could utilize an 1129 protocol and go through an SSP type central office 318 and the SS7 network. However, in the preferred embodiment shown in FIG. 3, the IP 358 and the ISCP 338 communicate with each other via a separate second signaling network, for example via the link 361 and the Operations Systems Network (OSN) 362 or intranet. These communications through the intranet OSN between the IP and the ISCP may utilize an 1129+ protocol or a generic data interface (GDI) protocol as discussed in the above incorporated Patent to Wheeler, Jr. et al.

In the operation of the network shown in FIG. 3, any given subscriber's telephone services may be controlled by data residing in one or more of the central office switching systems, in one or more SCPs 342 (and/or the peripherals at the ISCP site), or in the IP 358. In a network such as shown in FIG. 3, routing typically is based on dialed digit information, profile information regarding the link or station used by the calling party, and profile information regarding a line or station in some way associated with the dialed digits. The respective end office switches 314, 316, and 318 store the profiles associated with the stations or lines served out of those offices. In the intelligent network implementation, each SCP/ISCP maintains a Multi-Services Application Platform (MSAP) database, which contains call processing records (CPRs) for processing of calls to and from various subscribers to AIN type services. For some services requiring processing by the IP 358, the IP also may store subscriber specific control information, for use in providing the subscriber with the desired service. This includes the CALEA type surveillance service.

On a non-AIN call, an end office type switch will detect an off-hook condition on the line and provide dial tone. The switch identifies the line by its OE number. The office also retrieves profile information corresponding to the OE number and off-hook line. If needed, the profile identifies the currently assigned telephone number. The switch in the end office receives dialed digits and routes the call. The switch may route the call to another line serviced by that switch, or the switch may route the call over trunks and possibly through one or more tandem offices to an office that serves the called party's station or line. The switch terminating a call to a destination will also utilize profile information relating to the destination, for example to forward the call if appropriate, to apply distinctive ringing, etc.

AIN call processing involves a query and response procedure between an SSP capable switching office 314, 316, and 318, and a database system, such as the ISCP and its peripherals. The SSP capable switching offices initiate such processing upon detection of triggering events. At some point during processing of a telephone call, a central office switching system will recognize an event in call processing as a 'Point in Call' (PIC) which triggers a query, for example to the ISCP 338. Ultimately, the ISCP will return an instruction to the switching system to continue call processing pursuant to its instructions. This type of AIN call processing can utilize a variety of different types of triggers to cause the SSPs to initiate the query and response signaling procedures with the ISCP 338 and ISCP site 350 as well as the multi-service management platform 364.

The telephone carrier(s) operate a number of service and switch management systems, for creating and updating subscriber specific service control information at the various nodes in the telephone network. As mentioned earlier, call processing records (CPRs) in the data bases associated with each ISCP site are created and managed by a terminal system referred to as a service creation environment (SCE) and a service management system (SMS). Profile data may be loaded into memory in the switches by an automated system, such as Memory Administration Recent Change System or 'MARCH'. MARCH qualifies the data and transmits qualified data to the appropriate central office switch for entry into memory. The management systems also include a variety of data accumulation systems, for preparing usage statistics and/or calculating bills.

As mentioned previously, authorized surveillance falls into two categories, namely, surveillance of data as to called and calling parties, time and duration of calls, etc., and, on the other hand, surveillance of the actual content of the calls. Statistically 90 percent of authorized surveillance is directed at data. The network illustrated in FIG. 3 is designed to accomplish both data and content types of surveillance in accord with CALEA requirements.

Part of the ISCP site is the data distributor (DD) 348 which is available with modern SCPs. The data distributor is, among other things, a recording device to record information that has come from or which may be obtained from the switch. While the intelligent peripheral or IP 358 could be provided in a local distributed version with multiple IPs associated with multiple switches, it is preferably utilized in a remote fashion to serve an extended area, such as a LATA. In this configuration the IP 358 is connected to a proximate central office switch 318 via a primary rate ISDN connection to provide voice grade and data circuits. This is a dedicated or private link which offers continuous connectivity without call set up being required. In order that this single IP may serve the multiple switches in the particular area, these switches are connected to one another by similar dedicated primary rate ISDN links, indicated by the double arrow connections in FIG. 3. As previously stated, the link 366 between the intelligent peripheral and the surveillance station or FBI is preferably a similar dedicated link.

Considering first the data surveillance function, it is necessary to deal with two types of target calls. These comprise calls coming into the target, on the one hand, and calls that are originated by the target, on the other hand, i.e., incoming and outgoing calls. For the purpose of handling incoming calls, a terminating attempt trigger (TAT) is set in the central office 316 serving as the end office for the target station 326. For the purpose of handling outgoing calls from the target, an off-hook-delay (OHD) trigger is set in that central or end office. The off hook delay trigger is detected during off hook processing, however, the sending of the query from SSP 316 is delayed until digit collection is complete.

The party making the call from the target terminal will either dial a seven or ten digit number which is the directory number (DN) of the called party, or will dial a speed call. In this embodiment of the invention both options are covered for CALEA purposes. In the case of a speed call, the dialed characters are interpreted as directory numbers, are collected at the switch and sent to the SCP in the query message, along with the number of the target station and other data. The other data may include the date, the time of dialing, and the carrier which is to be used. This data is then collected in the data distributor 348.

The SCP reply to the query message preferably includes a send notification parameter message which activates a switch feature in the serving end office 316. The send notification parameter will determine and record whether the remote party was busy, whether the call was answered, and, if answered, the duration and time of termination of the call. This information is sent from the switch to the ISCP and thence to the data distributor 348 where it is recorded. In actuality two sets of messages are recorded, namely, the attempt signaling and the completion signaling. This is collected in the data distributor 348 and can be transferred from there to any other desired node. In this case it is sent to the authorized surveillance authority or FBI 324. Thus, the data required by CALEA specifications for outgoing calls can be collected in the data distributor and sent directly to the surveillance authority, in this case the FBI at 324. The data may be transferred via the direct data link 368, which is shown in FIG. 3. It will be understood that the necessary security servers and functions can be provided to maintain confidentiality of the information. The information can be provided on a near real time basis. The data is forwarded by the data distributor as promptly as possible and preferably is on a virtual real time basis.

In the case of incoming calls, a terminating attempt trigger is provided in the end office 316 for the DN of the target 326. Upon activation of the TAT trigger, the end office 316 suspends the call, sends a query to the ISCP, and collects designated information. This information would include the incoming call telephone number (DN), the date, and the time. A send notification parameter is also set to determine whether the target answered the phone and, if so, the duration of the call. This data is then sent to the data distributor 348 where it is recorded and then delivered to the surveillance office.

If the target is using a call forwarding service, the pertinent data can also be recorded at the switch and sent to the data distributor pursuant to instructions from the ISCP. A record can be made of the number to which the call was forwarded, if forwarding was activated, and the details regarding completion and termination of the call. The report to the surveillance authority will show the incoming call, the dialed telephone or directory number, the calling telephone number, the number to which a call forwarding attempt was made, whether the-call was completed to that number, the addresses of all directory numbers, and the duration of the call. The presence or absence of a directory number in the call forwarding field indicates whether or not call forwarding is activated.

It is another feature of the invention that the system shown in FIG. 3 permits recording whether and when call forwarding is installed, the identity of the forwarding number, and when the installed service is activated and de-activated. As previously discussed, the Service Order Administration and Control System (SOACS) 356 processes orders for new services or modifications to existing services. Thus, when a customer calls and orders call forwarding, SOACS performs a number of processes relating to satisfying that order and implementing the service. For the switch memory related functions, such as call forwarding, SOACS processes the data into appropriate format and hands off the formatted data to the MARCH system 352. MARCH in turn qualifies the data, and if the data meets the relevant qualification criteria, MARCH transmits the data to the appropriate central office switch through RCMAC for entry into memory.

According to one feature of the invention software is installed into one or more MARCH computers which list subscribers and directory numbers which are under surveillance. When the call forwarding service is installed and the necessary call forwarding data is forwarded to switch memory, the MARCH software triggers a deposit of all or part of that information in the data distributor. The information is thereupon reported to the surveillance authority over the link 368 between the data distributor and the surveillance authority station. The surveillance authority is thereby provided with virtually real time notification of the installation of call forwarding capabilities by the target. Similar triggering in MARCH can alert the surveillance authority to any changes in the CPR of the target in the switch memory.

Thus far the discussion regarding the FIG. 3 embodiment of the invention has dealt with surveillance of call set up, tear down, and the accumulation of the desired signaling data. In certain cases it is desired to monitor call content. This must be accomplished in a manner which is completely transparent to the parties involved in communication with the target. At the same time it is desirable to accomplish this goal with cost effective use of the telephone network plant facilities. Such goals are attained in this embodiment of the invention in the manner now described.

The intelligent peripheral or IP 358 is connected to the surveillance facility by the dedicated link 366. This link is preferably a primary rate (PRI) ISDN line. ISDN PRI is 23 B or bearer channels and one D or data channel. The B channel is used for the voice or content signals to the central office 318. The D channel is used for signaling and instructions to the intelligent peripheral. The connection between the IP and the central office 318 is also preferably a dedicated PRI ISDN link. Similarly the links between the central offices 318, 314, and 316 include dedicated PRI ISDN links.

The triggering for content surveillance is the same as described above for data. However in a content surveillance situation the customer profile record (CPR) of the target customer is modified in the SCP or ISCP, and in the switch and the intelligent peripheral. The response to the trigger query on both outgoing and incoming calls will include instructions to connect the call while carrying out other response instructions. These instructions would include a send to resource remote, i.e., the intelligent peripheral. At substantially the same time that this SS7 signaling occurs a second intranet signal is sent to the intelligent peripheral to set up a conference bridge with the completed call. That is, the response of the SCP to the trigger query would direct the switch to send the call to the IP over the dedicated link for bridging onto the call the dedicated surveillance link to the FBI. The intelligent peripheral, having received such bridging instructions via independent signaling from the SCP, will immediately set up the bridge. Time is critical in order to avoid any perceptible delay that might indicate that surveillance exists. One advantage of this procedure is that it requires only one dedicated link between the IP and the surveillance premises 324. This is in contrast to such a dedicated link being required between the surveillance premises and a large number of central offices, if the totality of the bridging occurred in a central office. Here the incoming or outgoing call to the target through the target end office 316 is connected in the switch 316. However, the call is extended via central offices 314 and 318 and their intervening dedicated PRI ISDN links to the intelligent peripheral 358. At the intelligent peripheral the surveillance-dedicated line 366 is bridged onto the call. It is preferable that the surveillance station includes suitable muting facilities as customer premise equipment.

According to a still further embodiment of the invention the advanced intelligent network is used in conjunction with programmable monitors to trap and temporarily store or record predetermined data associated with designated call attempts, call set-up, call tear down, originating and destinating directory numbers, call duration, and other information with respect to the telephone activities of identified parties under surveillance.

U.S. Pat. No. 5,475,732 issued to Eugene Pester Dec. 12, 1995, for Common Channeling Signaling Network Maintenance and Testing, describes an SS7 Network Preventative Maintenance System for detecting potential SS7 and switched network troubles, automatically analyzing the troubles, and providing alarm and corrective action to avoid major network events. The patent describes real time SS7 monitors placed on links at the Signal Transfer Points (STPs).

U.S. Pat. No. 5,592,530 issued to Brockman et al (Brockman) on Jan. 7, 1997 for Telephone Switch Dual Monitors, describes to testing and monitoring systems for evaluating the operations of telephone switches using monitors to capture data between nodes of a telephone switching system where the data flows between mated nodes, as in an SS7 common channel signaling network.

Figure 4:
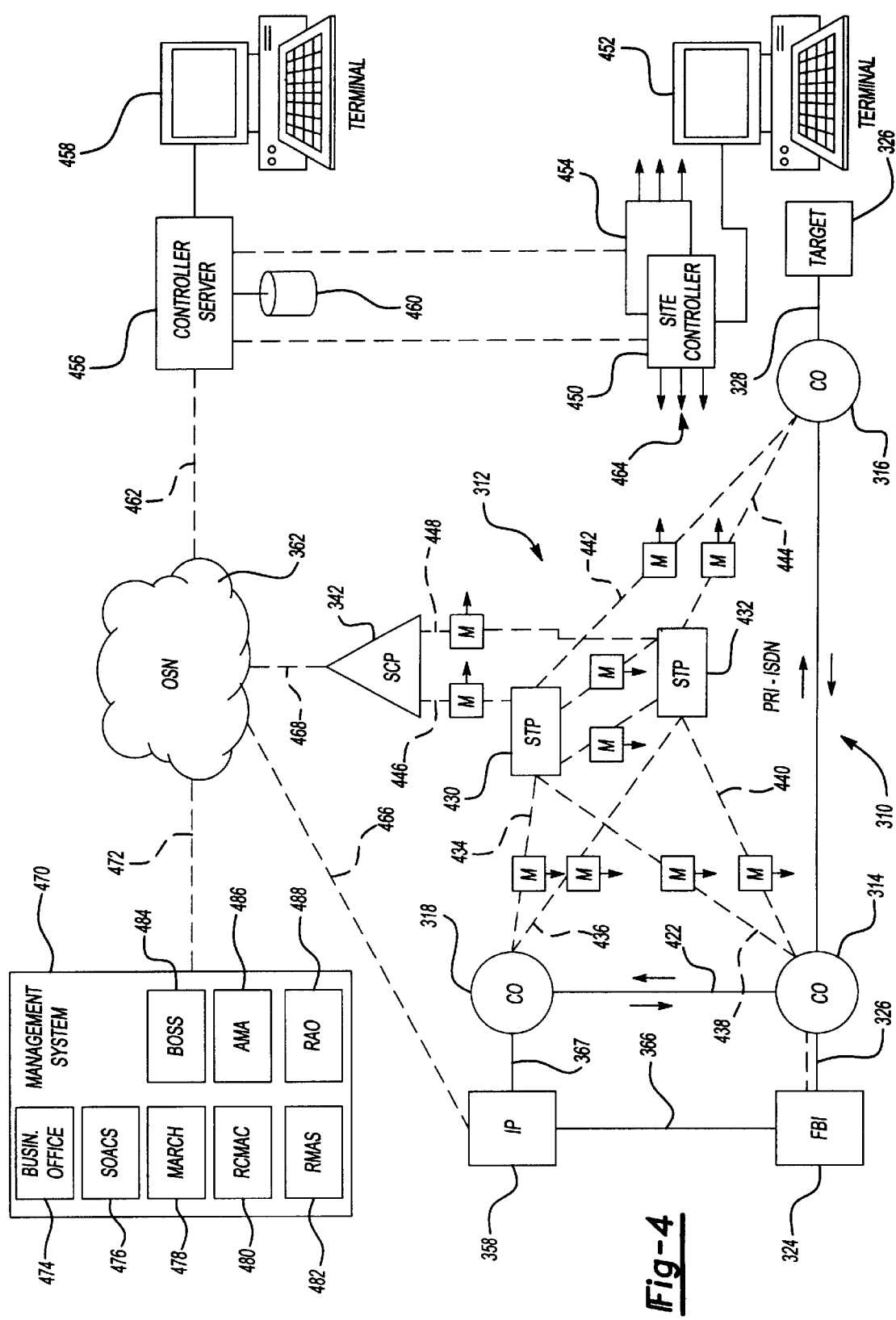
FIG. 4 is a diagrammatic illustration of a public switched telephone network showing its relation to an SS7 common channel interoffice signaling network, intranet, intelligent peripheral (IP), and SS7 monitoring system according to a further embodiment of the invention.

It has now been found that it is possible to use monitors of the type described in the Pester and Brokkman et al. patents in a new and different manner to achieve effective and advantageous surveillance. Referring to FIG. 4, there is shown an AIN controlled telephone network of the same general type as previously described in relation to FIG. 3. Like reference numerals are used in FIG. 4 to designate like elements. FIG. 4 shows at 430 and 432 signal transfer points (STPs) constituting a mated pair. As is known to those skilled in the art, signal transfer points are generally deployed in mated pairs at geographically spaced locations and connected to a service control point (SCP). A pair of end office switches with service switching point (SSP) capability is normally connected to the pair of STPs. Thus the signal transfer points 430 and 432 are connected to the central or end office switches 314 and 318. The connections 434, 436, 438, and 440 comprise SS7 data links shown with broken lines. The signal transfer points are also connected by SS7 links 442 and 444 to the central or end office 316 which serves the telephone station under surveillance (target) 326. The signal transfer points are connected to the SCP 342 by SS7 data links 446 and 448.

Because the advanced intelligent network is designedly a redundant system, the signals or messages between central office 314 and central office 318 may travel different paths. As a result, data relating to one session, event or parameter, such as signaling related to one call or call attempt might be found all in one STP, or split partially in one STP and partially in the other STP of the mated pair.

According to this embodiment of the invention the data links 438–448 connected to the STP pair 430–432 are provided with a series of monitors M. One monitor is bridged onto each link, with each monitor having receive and transmit ports. As will be understood by those skilled in the art, each SSP has a point code comprising a nine-digit code assigned to every node in the network. Each operating company has its own network ID normally represented by three digits in the point code. The point code also contains a three-digit cluster number. A cluster can include 32 central office switches or SSPs, the SSPs being designated by the final three numbers. The monitors M are addressable and have individual point codes for control and programming purposes.

The monitors include processors and temporary storage. Each of the monitors in a cluster for an STP is connected to a monitor or site controller 450. These connections are data connections or links which are indicated in FIG. 4 diagrammatically by small arrows at the respective monitors M and site controller 450. The controller 450 includes a processor and storage and is preferably provided with an operator terminal 452. The monitors and processors may be of the type described in the previously identified Pester Patent. That patent is incorporated by reference herein in its entirety. Additional site controllers, such as the controller 454 may be provided to handle other central offices and STPs in the system.

The site controllers are connected to a central or master controller and server 456. The master controller and server is preferably provided with an operator terminal 458 and storage 460. The storage 460 is of such a capacity as to serve the instantaneous needs of controller server 456 as well as provide archival storage of data for future reference. The controller server 456 is connected to the intranet or operating system network (OSN) 362 by the data link 462. It will be understood that the OSN represents internal data networks in the telephone system, such as for example, one or more of the internal data networks to which various management systems connect. For purposes of discussion herein, the internal data network(s) are collectively referred to as the OSN network. The connection of the management systems and the signal control point to the OSN 362 enables communication between the management systems and signal control point and the various nodes of the telephone network. The communications through network 362 between the controller server, the SCP, and the intelligent peripheral (IP), which is presently described, may utilize an 1129+ protocol or a generic data interface (GDI) protocol, as discussed in the above incorporated Patent to Wheeler and Farris.

As described in further detail in the Pester Patent, the monitors are controllable from remote stations to set traps which may be customized. Thus the monitors are programmed to trap packets and/or selectable fields and/or field contents on a real time basis to permit extremely rapid response to detected data. The monitors may comprise monitor circuit cards physically mounted at a monitor site controller 450 that holds all monitor cards for that cluster. The monitor site controller includes a processor and memory or storage that keeps track of all monitors and handles any messages.

The site controller 450 and its monitors M may be regarded as an interface with the SS7 network. The equipment may be conveniently mounted at or adjacent to the STP with which the monitors are associated. A function of the site monitor controller 450 is recording all of the data forwarded by the monitors M. The monitors may physically constitute a back plane capable of handling multiple cards. The monitor cards themselves include multiple monitors, such as four monitors per card. The monitors may be programmed by monitor control signals delivered to the monitors M either via the SS7 network or via the data link between each monitor M and its associated site monitor controller 450. In the first instance control signals may be delivered to specifically addressed monitors over the SS7 data links. In the latter instance the control signals are delivered over the separate data links 462 from the site monitor controller 450 to the monitors M.

The processor in the master controller and server 456 and/or the site controllers 450, may be loaded with the desired program or script via the operator terminals 458 and/or 454. This script will specify for identified monitors the particular signals or portions of signals to be trapped and the identification and nature of the output signal to be delivered to the site monitor controller 450. The site controller receives this designated information from all specified monitors in its cluster and provides an output signal to the server controller 456. Filtering may occur at the monitors M as they trap and buffer the designated data. Alternatively, the monitors M may be programmed to deliver all detected signals to the site monitor 450. The desired filtering may then be performed by that processor and storage.

As in the embodiment of the invention described in connection with FIG. 3, the intelligent peripheral or IP 358 may be of the type described in the commonly assigned Wheeler and Farris Patent. Here the IP connects through telephone line groups to one or more Service Switching Point (SSP) offices of the telephone network. The IP also communicates with the SCP. This communication is via a signaling network separate from the voice circuits and from the CCIS network, such as the OSN intranet 362. Among other functions, the IP 358 participates in provisioning and/or modifying various Telco provided services such as call forwarding, and in setting up and tearing down content surveillance.

The intelligent peripheral or IP 358 connects to at least one of the central offices 314, 316, and 318. This connection is shown as central office 318 in FIG. 4. The connections transport both communication traffic and signaling. While the connection between the central office 318 and the JP 358 might use a combination of a T1 and a Simplified Message Desk Interface (SMDI) link, this connection preferably utilizes a primary rate interface (PRI) type ISDN link. Each such connection provides digital transport for a number of two-way voice grade type telephone communications and two-way signaling data messages between the switch 318 and the IP 358.

There are certain circumstances in which the ISCP 342 communicates with the IP 358. These communications also could utilize an 1129 protocol and go through an SSP type central office 318 and the SS7 network. However, in the preferred embodiment shown in FIG. 4, the IP 358 and the SCP 342 communicate with each other via the separate second signaling network, for example via the links 466 and 468 and the Operations Systems Network (OSN) 362 or intranet. These communications through the OSN between the IP and the SCP may utilize an 1129+ protocol or a generic data interface (GDI) protocol as discussed in the above discussed and incorporated Patent to Wheeler and Farris.

The intelligent peripheral or IP 358 is connected to the surveillance facility 324 by the dedicated link 366. This link is preferably a primary rate (PRI) ISDN line. The B or bearer channel is used for the voice or content signals to the central office 318. The D channel is used for signaling and instructions to the intelligent peripheral. The connection between the IP and the central office 318 is also preferably a dedicated PRI ISDN link 367. Similarly the trunks between the central offices 318, 314, and 316 include dedicated PRI ISDN links. The link 367 between the IP and the central office 318 is preferably a private link which offers continuous connectivity without call set up being required.

This embodiment of the invention also relies on the telephone network management system shown in FIG. 4 at 470. This system and its internal networks are linked to the collective operating system network or OSN via the link 472. This preferably uses 1129+ protocol or a generic data interface (GDI) protocol. Shown in the management system in FIG. 4 are a business office module 474, SOACS module 476, MARCH module 478, RCMAC module 480, RMAS module 482, BOSS module 484, AMA module 486, and RAO module 488. SOACS is the Service Order Analysis and Control or the controller portion of the FACS family of systems (Facilities Assignment and Control System). MARCH is the Memory Administration Recent Change System (formerly MIZAR), which is a software product that accepts input from the SOAC component of FACS, interprets the information, and formulates the switch specific message that is ultimately sent to the switch to activate the customers' service request. RCMAC is the Recent Change Memory Administration Center, which is the work group responsible for memory administration changes to the central office switch. RMAS is the Remote Memory Administration System, which is the support system for creating recent change messages and interacting with the central office switch for line memory changes. BOSS is the Billing Order Support System. This system is used by Residence and Business Service Centers to assist service representatives with billing inquiries and services. It interfaces with CRIS (Customer Records Information System) and provides current monthly bill, previous bill, payments, and audit trail of account history. AMA is the Automated Message Accounting, which is the automated call detail recording system. RAO is the Revenue Accounting Office, which is unit that administers payment management and billing systems support. The management system is used pursuant to this embodiment of the invention to provide information as to changes in the services to which the target subscribes, any change in the customer profile record (CPR), and to provide billing from information delivered by the controller server 456 and obtained from the operating service network.

The monitor network provides in the controller server database 460 all of the information which was obtained from the SS7 advanced intelligent network in the embodiment shown in FIG. 3. This is transmitted via the operating system network or OSN via the link 466 to the intelligent peripheral 358. The information may be temporarily stored in the IP for combining with information received from the management system 470. Alternately, the information may be delivered directly to the storage and processors of the surveillance center 324. Similarly, the management system 470 may deliver its service installation and service or profile change information to the intelligent peripheral for temporary storage or direct transmittal to the surveillance processor and database.

The operation of this preferred embodiment of the invention is now described. The central office 316 serving the target station 326 has set therein a terminating attempt trigger (TAT) for the directory number of the target. It also has set therein an off-hook delay (OHD) trigger on the line of the target station. According to the invention the customer profile record for the target station has been modified in the SCP and in the central office switch 316, to require AIN processing of all calls to and from the target station. This results in intra-office as well as inter-office calls in central office 316 producing suspension of calls and a query to the SCP via an STP.

Considering first data surveillance and a call originating with the target station 326; the target station will either dial the directory number (DN) of the called party, or will speed dial a call. In the case of a speed call, the dialed characters are interpreted as directory numbers, collected at the switch, and sent to the SCP in the query message, along with the number of the target station and other data. The other data may include the date, the time of dialing, and the carrier which is to be used. This data is trapped by the monitors in the SS7 links 442, 444, 446, and 448. The data from the multiple links is correlated combined in the manner described in the above discussed Pester and Brockman patents, and sent by the site controller 450 to the controller server 456. Here it is stored in the database 460.

The SCP reply to the query message preferably includes a send notification parameter message which activates a switch feature in the serving end office 316. The send notification parameter will determine and record whether the remote or called party was busy, whether the call was answered, and, if answered, the duration and time of termination of the call. This information is trapped or detected in the AIN messages to and from the originating and terminating SSPs and/or the SCP. The data is trapped by the monitors, combined, and sent to the controller server 456 where it is stored. In actuality two sets of messages are stored, namely, the attempt signaling and the completion signaling. This is then transmitted via the OSN and IP to the surveillance authority at 324. The information may be collected by the controller server for transmission as a complete entity, or may be transmitted in virtual real time. Virtual real time transmission may be achieved because the information is moving through the monitor network and encounters minimal or no contention delays. This is advantageous in content surveillance, where all content must be captured with maximum transparency.

In the case of incoming calls, the terminating attempt TAT) trigger in the target end office 316 is activated. The end office suspends the call, sends a query to the SCP, and collects designated information. This information would include the incoming call telephone number (DN), the date, and the time. A send notification parameter is also set to determine whether the target answered the telephone and, if so, the duration and time of termination of the call. If the line was busy or not answered this also would be signaled in the AIN signaling on the SS7 links. This information is trapped or detected in the AIN messages to and from the originating and terminating SSPs and/or the SCP. The data is correlated and combined as previously described, and again the information may be collected by the controller server for transmission as a complete entity or may be transmitted in virtual real time.

If the target 326 is using a call forwarding service, the pertinent data can be detected from the AIN signaling messages picked up by the monitors on the AIN links. This would include the number to which the call was forwarded, if forwarding was activated, and the details regarding completion and termination of the call, such as the dialed telephone or directory number, the calling telephone number, the number to which a call forwarding attempt was made, whether the call was completed to that number, the addresses of all directory numbers, and the duration and time of completion of the call.

This information is trapped or detected in the AIN messages, consolidated, and transmitted to and stored in the controller server 456. From here the information may be transmitted as a complete entity or may be transmitted in virtual real time to the surveillance processor via the OSN and IP.

The system shown in FIG. 4 permits recording whether and when call forwarding is installed, the identity of the forwarding number, and when the installed service is activated and de-activated. This information may be obtained from the management system 470 in the manner previously described and partially from the SS7 and monitor networks. Changes in the CPR of the target in the switch memory may be transmitted to the surveillance terminal as previously described.

With respect to surveillance of call content, the embodiment of FIG. 4 is provided with an architecture similar to that in FIG. 3. Thus, the intelligent peripheral or IP 358 is connected to the surveillance facility by the dedicated link 366. This link is preferably a primary rate (PRI) ISDN line. The connection between the IP and the central office 318 is also preferably a dedicated PRI ISDN link. Similarly the links between the central offices 318, 314, and 316 include dedicated PRI ISDN links.

The point-in-call triggering for content surveillance is the same as described above for data surveillance. However in a content surveillance situation, the customer profile record (CPR) of the target is modified in the SCP, and in the switch, and the intelligent peripheral. The SCP response to the trigger query on both outgoing and incoming calls will include instructions to connect the call, while carrying out other response instructions. These instructions would include a send to resource remote, i.e., the intelligent peripheral. At substantially the same time that this SS7 signaling occurs, a second intranet signal is sent to the intelligent peripheral to set up a conference bridge with the completed call. That is, the response of the SCP to the trigger query would direct the central office switch 316 to send the call to the IP 358 over the dedicated link 367 for bridging onto the call the dedicated surveillance link 366 to the surveillance station 324. The intelligent peripheral, having received such bridging instructions via independent signaling from the SCP, will immediately set up the bridge. The AIN signaling is detected by the monitors and forwarded to the surveillance terminal.

The incoming or outgoing call to the target through the target end office 316 is connected in the switch 316. However, the call is extended via central offices 314 and 318 and their intervening dedicated PRI ISDN Elinks to the intelligent peripheral 358. At the intelligent peripheral the surveillance-dedicated line 366 is bridged onto the call.

Call content may then be recorded at the surveillance terminal.

As a further feature of this embodiment of the invention, the controller server 456 may transmit to BOSS in the management system 470, sufficient data to permit near real time output of billing records. These bills would go to the surveillance authority and the data may be provided to the surveillance authority over the data links between the management system 470 and surveillance terminal 324. In this case that data would go over the link 472 through the OSN 362, the link 466 and via the IP 358 and ISDN link 366.

It will be seen that this embodiment of the invention provides an alternate architecture and methodology for carrying out surveillance to satisfy CALEA safe harbor requirements. A monitor network is arranged to provide the performance and information which has been previously described with respect to the preceding embodiments of the invention. However the system may permit a closer approach to virtual real time reporting with improved transparency. The archival recording of records in the controller server storage 460 provides both additional safety for the data, along with a corrroborating evidentiary record to back up the evidence which may be recorded in the surveillance terminal. The system also provides virtual real time billing records. These records may provide still further supporting data from an evidentiary standpoint.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A telecommunications system comprising:
    a switched telephone network having a plurality of switching systems connected by trunks, at least a first and a second of said switching systems being connected by links to first and second customer premises;
    a packet switched control network separate from said switched telephone network and including a mated pair of packet switches connected by links to said first and second switching systems and to a central controller;
    a monitor network including interfaces to at least certain of said links in said control network detecting signals therein and transmitting signals to a monitor network controller indicative of calls to or from said first customer premises;
    a management system for said telephone network controlling installation and changes in customer service; and
    communication paths between said monitor network and said management system transmitting to said second customer premises signals including information relating to services supplied to said first customer premises and use thereof.

2. A system according to claim 1 wherein said service supplied to said first customer premises include service in addition to basic telephone service.

3. A system according to claim 2 wherein said information relating to service includes the time of activation of said service.

4. A system according to claim 3 wherein said information related to service includes information related to use of said activated service.

5. A system according to claim 2 wherein said service in addition to basic telephone service comprises call forwarding.

6. A system according to claim 1 wherein said information relating to services supplied to said first customer premises includes information relating to a change in the customer profile record for said first customer premises.

7. A system according to claim 1 wherein said packet switched control network comprises a common channel signaling network.

8. A system according to claim 7 wherein said common channel signaling network comprises an advanced intelligent network.

9. A system according to claim 8 wherein said detected signals comprise common channel signaling including call set-up and tear-down signals.

10. A system according to claim 8 wherein said first switching system has point in call triggers set therein.

11. A system according to claim 10 wherein said triggers cause common channel signaling on all calls to or from said first customer premises terminal.

12. A system according to claim 11 wherein said calls include calls completed within said first switching system.

13. A telecommunications system comprising:
    a switched telephone network including first and second switching systems, said first switching system connected to a first customer premises and said second switching system connected to a second customer premises;
    a first system for controlling said telephone network and having a controller connected to said first and second switching systems via a first control network including data links and at least one packet switch, said first system for controlling being connected to said first and second switching systems by said links;
    a second system for controlling said telephone network and having a multi-application platform connected to said telephone network by a second control network separate from said first control network;
    a third control system having interfaces to links in said first system and capturing selected control signals flowing through said links and providing input to a controller for said third control system;

said second and third control systems transmitting to said second customer premises signals reporting use of said telephone network by said first customer premises.

14. A system according to claim 13 wherein said second system for controlling said telephone network includes applications for installing and changing service to said first customer premises.

15. A system according to claim 14 wherein said third control system comprises a monitoring system generating signals reporting use and attempted use of said telephone network by said first customer premises.

16. A system according to claim 15 wherein said first system for controlling said telephone network comprises a common channel signaling system.

17. A system according to claim 13 wherein said second system for controlling transmits to said second customer premises information relating to a change in the customer profile record for said first customer premises.

18. A system according to claim 13 wherein said first switching system has point in call triggers set therein.

19. In a telecommunications system including a switched telephone network including switching systems connected by trunks and serving subscribers connected to said switching systems, said telecommunications system including separate control systems controlling the operation of said switched telephone network;

a method comprising:
  responding to a first of said subscribers connected to a first of said switching systems going off-hook by initiating call set-up procedures under the control of a first of said separate control systems responsive to signaling through said first control system;
  detecting said signaling through said first control system under control of a second of said control systems and, responsive thereto and to signals through said second control system, transmitting to a second subscriber connected to one of said switching systems data regarding said call set-up procedures;
  maintaining in a third of said control systems a profile of the subscribed services of said first subscriber, and transmitting to said second subscriber data regarding service to said first subscriber.

20. A method according to claim 19 wherein said data is delivered to said second subscriber via a communication path other than through said trunks or said first control system.

21. A method according to claim 20 wherein said detecting comprises said second control system monitoring the signaling in said first control system, and including the step of generating said data transmitted to said second subscriber.

22. A method according to claim 20 wherein said data transmitted from said third control system to said second subscriber includes data reporting a change in said profile of said first subscriber.

23. A method according to claim 20 wherein said data transmitted from said third control system to said second subscriber includes data relating to the time of installation of call forwarding service to said first subscriber.

24. A method according to claim 19 including the step of said second control system transmitting data regarding said call set-up procedures to said third control system.

25. A method according to claim 24 including the step of said third control system performing billing procedures responsive at least in part to said data from said second control system.

26. A method according to claim 25 wherein said first control system comprises a common channel signaling system.

27. A method according to claim 19 including the step of setting up a communication path through said telephone network from said first subscriber to a third subscriber connected to one of said switching systems at least in part responsive to said initiation of call set-up procedures.

28. A method according to claim 27 including the step of including in said data transmitted to said second subscriber data relating to the tear-down of said communication path.

29. In a telecommunications system comprising:
  a switched telephone network including program controlled switching systems connected by trunks and connected by links to subscriber terminals;
  a separate control network having packet switching systems connected to said program controlled switching systems and to a central control, said central control having processor and storage devices controlling through said control network routing of communication paths through said switched telephone network;
  a first subscriber terminal connected to a first of said program controlled switching systems by a first of said links;
  a second subscriber terminal connected to a second of said program controlled switching systems by a second of said links;
  a method comprising:
    responsive to an attempt to establish connections through said telephone network between said first subscriber terminal and a third subscriber terminal connected to one of said program controlled switching systems, signaling through said control network;
    detecting said signaling through said control network in a monitoring network;
    responsive at least in part to said detection of said signals, generating in said monitoring network data regarding connections established through said telephone network between said first subscriber terminal and a third subscriber terminal connected to one of said program controlled switching systems;
    storing in a storage associated with said monitoring network at least a part of said data generated therein; and
    transmitting at least a part of said data from said storage associated with said monitoring network to said second subscriber terminal.

30. A method according to claim 29 including the step of transmitting said data from said storage associated with said monitoring network to said second subscriber terminal via a path other than through said control network.

31. A method according to claim 29 wherein said data includes identification of said third subscriber terminal.

32. A method according to claim 29 wherein said information includes identification of said third subscriber terminal, the time of the initiation of connection and the duration thereof.

33. A telecommunications system comprising:
  a switched telephone network having a plurality of switching systems connected by trunks, at least a first and a second of said switching systems being connected by links to first and second customer premises;
  a packet switched control network separate from said switched telephone network and including a mated pair of packet switches connected by links to said first and second switching systems and to a central controller;

a monitor network including interfaces to at least certain of said links in said control network detecting signals therein and transmitting signals to a monitor network controller indicative of calls to or from said first customer premises;

a management system for said telephone network controlling installation and changes in customer service;

communication paths between said monitor network and said management system transmitting to said second customer premises signals including information relating to services supplied to said first customer premises and use thereof; and a third customer premises to which said first customer premises is connected, and including a bridge providing a one way connection of said second customer premises to said connection between said first and third customer premises.

34. A system according to claim 33 wherein said bridge occurs at least partially in an adjunct processor connected to one of said switching systems in said telephone network.

35. A telecommunications system comprising:

a switched telephone network including first and second switching systems, said first switching system connected to a first customer premises and said second switching system connected to a second customer premises;

a first system for controlling said telephone network and having a controller connected to said first and second switching systems via a first control network including data links and at least one packet switch, said first system for controlling being connected to said first and second switching systems by said links;

a second system for controlling said telephone network and having a multi-application platform connected to said telephone network by a second control network separate from said first control network; and a third control system having interfaces to links in said first system and capturing selected control signals flowing through said links and providing input to a controller for said third control system;

wherein said second and third control systems transmitting to said second customer premises signals reporting use of said telephone network by said first customer premises;

wherein said second system for controlling said telephone network includes applications for installing and changing service to said first customer premises;

wherein said third control system comprises a monitoring system generating signals reporting use and attempted use of said telephone network by said first customer premises;

wherein said first system for controlling said telephone network comprises a common channel signaling system; and wherein said third control system captures selected common channel signaling signals in two common channel signaling links to said first switching system and consolidates the captured signals to provide a call detail record for calls to and from said first customer premises.

36. A system according to claim 35 wherein said third control system transmits signals to said second system for controlling and said second system for controlling produces billing documentation based at least in part on said signals transmitted from said third to said second control systems.

37. A telecommunications system comprising:

a switched telephone network including first and second switching systems, said first switching system connected to a first customer premises and said second switching system connected to a second customer premises;

a first system for controlling said telephone network and having a controller connected to said first and second switching systems via a first control network including data links and at least one packet switch, said first system for controlling being connected to said first and second switching systems by said links;

a second system for controlling said telephone network and having a multi-application platform connected to said telephone network by a second control network separate from said first control network;

a third control system having interfaces to links in said first system and capturing selected control signals flowing through said links and providing input to a controller for said third control system;

a third customer premises to which said first customer premises is connected via said telephone network, and including a bridge providing a one way connection of said second customer premises to said connection between said first and third customer premises; and wherein said second and third control systems transmitting to said second customer premises signals reporting use of said telephone network by said first customer premises.

38. A telecommunications system comprising:

a switched telephone network including first and second switching systems, said first switching system connected to a first customer premises and said second switching system connected to a second customer premises;

a first system for controlling said telephone network and having a controller connected to said first and second switching systems via a first control network including data links and at lease one packet switch, said first system for controlling being connected to said first and second switching systems by said links;

a second system for controlling said telephone network and having a multi-application platform connected to said telephone network by a second control network separate from said first control network;

a third control system having interfaces to links in said first system and capturing selected control signals flowing through said links and providing input to a controller for said third control system; and wherein said second and third control systems transmitting to said second customer premises signals reporting use of said telephone network by said first customer premises;

wherein said first switching system has point in call triggers set therein;

wherein said triggers cause common channel signaling on all calls to or from said first customer premises.

39. A system according to claim 38 wherein said calls include calls completed within said first switching system.

40. In a telecommunications system including a switched telephone network including switching systems connected by trunks and serving subscribers connected to said switching systems, said telecommunications system including separate control systems controlling the operation of said switched telephone network;

a method comprising:
responding to a first of said subscribers connected to a first of said switching systems going off-hook by initiating call set-up procedures under the control of a first of said separate control systems responsive to signaling through said first control system;
detecting said signaling through said first control system under control of a second of said control systems and, responsive thereof and to signals through said second control system, transmitting to a second subscriber connected to one of said switching systems data regarding said call set-up procedures;
maintaining in a third of said control systems a profile of the subscribed services of said first subscriber, and transmitting to said second subscriber data regarding service to said first subscriber; and
bridging said second subscriber onto said communication path via a one way connection.

41. A method according to claim 40 wherein said bridging is performed at least in part in an adjunct processor.

42. In a telecommunications system comprising:
a switched telephone network including program controlled switching systems connected by trunks and connected by links to subscriber terminals;
a separate control network having packet switching systems connected to said program controlled switching systems and to a central control, said central control having processor and storage devices controlling through said control network routing of communication paths through said switched telephone network;
a first subscriber terminal connected to a first of said program controlled switching systems by a first of said links;
a second subscriber terminal connected to a second of said program controlled switching systems by a second of said links;
a method comprising:
responsive to an attempt to establish connections through said telephone network between said first subscriber terminal and a third subscriber terminal connected to one of said program controlled switching system, signaling through said control network;
detecting said signaling through said control network in a monitoring network;
responsive at least in part to said detection of said signals, generating in said monitoring network data regarding connections established through said telephone network between said first subscriber terminal and a third subscriber terminal connected to one of said program controlled switching systems;
storing in a storage associated with said monitoring network at least a part of said data generated therein, wherein data stored in the step of storing includes data regarding unsuccessful attempts to establish connections through said telephone network between said first subscriber terminal and a third subscriber terminal connected to one of said program controlled switching systems;
transmitting at least a part of said data from said storage associated with said monitoring network to said second subscriber terminal.

* * * * *